United States Patent [19]
Bahel et al.

[11] Patent Number: 5,381,669
[45] Date of Patent: Jan. 17, 1995

[54] OVERCHARGE-UNDERCHARGE DIAGNOSTIC SYSTEM FOR AIR CONDITIONER CONTROLLER

[75] Inventors: Vijay Bahel, Sidney; Hank Millet, Piqua; Mickey Hickey, Sidney; Hung Pham, Dayton; Gregory P. Herroon, Piqua, all of Ohio

[73] Assignee: Copeland Corporation, Sidney, Ohio

[21] Appl. No.: 95,897

[22] Filed: Jul. 21, 1993

[51] Int. Cl.[6] .............................. F25B 49/02
[52] U.S. Cl. ............................ 62/129; 62/149
[58] Field of Search .............. 62/129, 125, 126, 127, 62/131, 149

[56] References Cited

U.S. PATENT DOCUMENTS

| | | | |
|---|---|---|---|
| 2,978,879 | 4/1961 | Heidorn | 62/209 |
| 3,047,696 | 7/1962 | Heidorn | 200/140 |
| 3,107,843 | 10/1963 | Finn | 230/6 |
| 3,278,111 | 10/1966 | Parker | 230/17 |
| 3,729,949 | 5/1973 | Talbot | 62/149 |
| 4,220,010 | 9/1980 | Mueller et al. | 62/126 |
| 4,236,379 | 12/1980 | Mueller | 62/126 |
| 4,328,678 | 5/1982 | Kono et al. | 62/126 |
| 4,510,576 | 4/1985 | MacArthur et al. | 364/551 |
| 4,611,470 | 9/1986 | Enström | 62/127 |
| 4,612,775 | 9/1986 | Branz et al. | 62/126 |
| 4,677,830 | 7/1987 | Sumikawa et al. | 62/126 |
| 4,745,765 | 5/1988 | Pettitt | 62/129 |
| 5,142,877 | 9/1992 | Shimizu | 62/129 |
| 5,241,833 | 9/1993 | Ohkoshi | 62/129 X |
| 5,243,829 | 9/1993 | Bessler | 62/129 X |

*Primary Examiner*—Harry B. Tanner
*Attorney, Agent, or Firm*—Harness, Dickey & Pierce

[57] ABSTRACT

The refrigeration control software periodically checks for overcharge and undercharge conditions by placing the expansion valve at a predetermined setting, based on measured environmental temperature. While the expansion valve is at the predetermined setting a series of compressor discharge temperature readings are taken to obtain an average reading and this average reading is compared with a reference value. An undercharge condition is declared when the average reading is greater than the reference value and an overcharged condition is declared when the average reading is less than the reference value.

11 Claims, 14 Drawing Sheets

OVERCHARGE-UNDERCHARGE DIAGNOSTIC SYSTEM FOR AIR CONDITIONER CONTROLLER

BACKGROUND AND SUMMARY OF THE INVENTION

The present invention relates generally to electronic control systems for air conditioners, heat pumps and refrigeration equipment. More particularly, the invention relates to an apparatus and method using digital circuitry for controlling the heat pump during its normal operating cycle and for performing self-diagnostics to detect refrigerant overcharge and undercharge conditions.

Whether operating as an air-conditioning system or a heat pump system the basic refrigeration cycle operates by metering refrigerant through a closed system in a precisely controlled manner. The refrigerant cools by evaporation in a heat exchanger commonly called an evaporator coil. The refrigerant is metered to the evaporator coil through an orifice sometimes called an expansion valve. Ideally, the refrigeration system should meter just enough refrigerant into the evaporator coil, so that the refrigerant extracts heat throughout the length of the coil as it evaporates. Due to changing dynamics of the system, changes in thermostat settings, changes in load from the sun, wind and so forth, the optimal flow through the expansion valve will need to be varied as the system operates.

Most refrigeration systems employ feedback techniques to sense the system operating conditions and to control the expansion valve so that the desired refrigerant flow through the system is maintained. For example, many systems measure a value called superheat and use this value to control the quantity of refrigerant flow through the expansion valve. Superheat is a measurement of the degree to which the refrigerant in the vapor phase has risen in temperature above the evaporation temperature. In a properly operating system the superheat condition is expected to occur approximately adjacent the exit end of the evaporator coil. Using feedback control techniques, the measured superheat value is compared with a set point value and the error or difference between those two values is used to regulate the refrigerant flow.

Generally speaking the classic feedback control system works well in controlling refrigerant flow in a refrigeration system, provided the system is not undercharged or overcharged with refrigerant. Over time, due to expansion and contraction by temperature change, due to vibration and other physical movement of the system components and due to the eventual deterioration of seals, fittings and components, refrigerant can escape. This results in an undercharged condition. The undercharged condition is characterized by an inadequate quantity of refrigerant. When an undercharge condition occurs, the feedback control system will try to hold the set point temperature, but will be unable to do so because of the inadequate supply of refrigerant. This in turn will cause a rise in system temperatures and results in the general inability to produce sufficient cooling.

The overcharge condition is just the opposite of the undercharge condition. The overcharge condition occurs when a maintenance person or homeowner puts too much refrigerant into the system (i.e. more than that recommended by manufacturer specifications). In an overcharge condition the system will try to maintain the set point temperature. However, due to the excessive charge, the resultant temperature will be too low, leading to inefficient operation, system freeze-up and undue wear on system components resulting from floodback of compressor thereby affecting the reliability of the system.

In a conventional refrigeration system the onset of an undercharge condition will probably go undetected until the system is no longer able to provide adequate cooling. In such cases the home or building is left without air-conditioning (quite often during the hottest days of the year) until a service call can be made.

Detecting an overcharge condition in the conventional system is even more difficult, since the homeowner or building occupant may not notice any problem (other than possibly noticing higher electric bills) until the system shuts down altogether due to component (compressor) failure.

Thus it would be very desirable to provide a foolproof and convenient way of checking for both undercharge and overcharge conditions and of providing an early warning to homeowners and building maintenance personnel. The present invention provides such a system. It is integrated into the refrigeration flow control system and is able to detect both overcharge and undercharge conditions. As more fully explained below in connection with the detailed description of the presently preferred embodiment, the present invention detects the undercharge condition by monitoring the setting of the expansion valve and monitoring the compressor discharge temperature. The system uses compressor discharge temperature as a measure of superheat.

The system tests for the overcharge and undercharge condition by periodically placing the expansion valve in a predetermined known setting and by then measuring the resultant compressor discharge temperature. The measured temperature is compared with a reference value stored in a look-up table. If the measured temperature is out of tolerance, that is, below a predetermined minimum value, then an overcharge condition is declared. Similarly, if the discharge temperature is above the reference value, then an undercharge condition is declared.

In accordance with one aspect of the invention a method of diagnosing an undesired refrigerant charge condition is provided. The method involves storing at least one temperature reference value and at least one valve setpoint value. In the preferred embodiment tables of temperature reference values and valve setpoint values are utilized. According to the method, a quantity indicative of environment temperature is measured to determine a first measured temperature value. The expansion valve of the refrigeration system is then caused to attain a predetermined setting, based on the valve setpoint value. While the valve is at the predetermined setting, a quantity indicative of refrigeration system temperature is measured to determine a second measured temperature value. In the preferred embodiment the first measured temperature value is based on outdoor air temperature and the second measured temperature value is based on compressor discharge temperature. The method proceeds by using the first measured temperature value to access the stored temperature reference value and comparing the accessed temperature reference value with the second measured temperature value. An undesired refrigerant charge condition is declared (e.g. overcharge or undercharge) when the accessed temperature reference value and the second measured temperature value are not within a predefined numerical proximity to one another. If desired, the undesired refrigerant charge condition is declared as an overcharge condition when the second measured value is less than the temperature reference value. Similarly, an undercharge condition is declared when the second measured value is greater than the temperature reference value.

In accordance with one aspect of the invention a method of diagnosing a loss of refrigerant charge condition is provided. The method is effected by storing a temperature setpoint value and a valve limit value. A quantity indicative of the refrigeration system temperature is measured to determine a first measured value and the setting of the expansion valve is monitored to determine a second measured value. A loss of refrigerant charge condition is declared when (a) the second measured value is in a predefined proximity to the valve limit value and (b) the first measured value is outside a predefined proximity to the temperature setpoint value.

According to another aspect of the invention a method of diagnosing a refrigerant overcharge condition is provided. The method is effected by storing a temperature setpoint value and a valve setpoint value and periodically causing the expansion valve to attain a setting determined by the valve setpoint value. In the presently preferred embodiment a fully open setting is preferred, although other settings can also be employed. While the expansion valve is at the setting determined by the valve setpoint value, a quantity indicative of refrigeration system temperature is measured and a measured value is thus determined. An overcharge condition is declared to exist when the measured value is outside a predefined proximity to the temperature setpoint value.

Yet another aspect of the invention is a method of diagnosing an incorrect charge condition. The method is effected by storing a temperature setpoint value and a valve target position value. The setting of the expansion valve is monitored to determine a valve setting value. This valve setting value is compared with the valve target position value. When the valve setting value and the valve target position value are within a predefined proximity to one another a quantity indicative of refrigeration system temperature is measured to determine a refrigeration value. An incorrect charge condition is declared to exist when the refrigeration value is outside a predefined proximity to the temperature setpoint value.

For a more complete understanding of the invention, its objects and advantages, reference may be had to the following specification and to the accompanying drawings.

DESCRIPTION OF THE PREFERRED EMBODIMENT

The present invention provides an apparatus and method for diagnosing the refrigerant charge problems in air conditioners, heat pumps operating in cooling mode and refrigeration equipment. The system employs a microprocessor-based control system with a unique complement of sensors and an electronically controlled stepper motor expansion valve. To illustrate the principles of the invention a refrigeration or air conditioner system capable of providing cooling will be described. A refrigeration system of the type described might be suitable for cooling a commercial or residential building, although the principles of the invention are not limited to commercial and residential heating and cooling and are applicable to all pumped heat transfer systems.

REFRIGERATION CYCLE OVERVIEW

Figure 1:
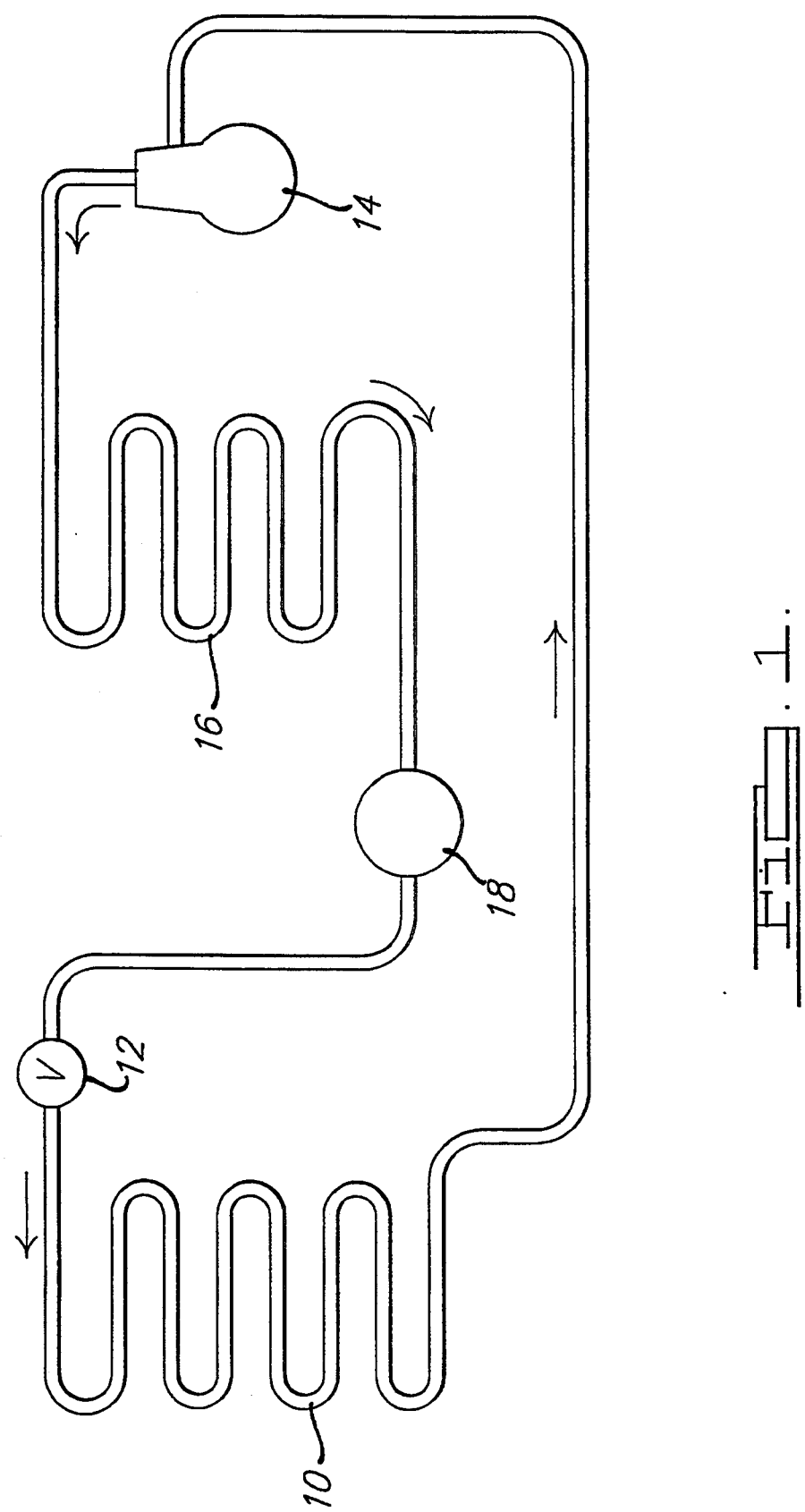
FIG. 1 is a schematic representation of the basic refrigeration cycle.

Before giving a detailed description of the presently preferred embodiment, a brief review of the refrigeration cycle will be given. That cycle will be described in connection with a basic cooling system illustrated schematically in FIG. 1.

Basically the refrigeration cycle uses the cooling effect of evaporation to lower the temperature or "air condition" the surroundings. This is accomplished by releasing a refrigerant under pressure (usually in the liquid phase) into a low pressure region to cause the refrigerant to expand into a low temperature mixture of gas and liquid. This refrigerant mixture now in the evaporator coil 10 is exposed to the high temperature ambient air of the region desired to be cooled. Evaporation of liquid refrigerant to gas absorbs heat from circulating air and thereby cooling it. A fan or blower is often used to force the ambient air into more rapid contact with the cool evaporator coil to increase heat transfer. The refrigerant is able to evaporate or boil in the evaporator coil because of the lower pressure. In order to make the transition from the liquid to the gaseous phase the latent heat of vaporization must be added. This heat is, of course, extracted from the ambient air environment surrounding the evaporator coil.

The flow of refrigerant in the high pressure (liquid) state into the low pressure evaporator is usually metered by a restricted orifice or valve commonly called an expansion valve 12. There are a wide variety of different types of expansion devices in use today, ranging from simple nonadjustable capillary tubes to electrically adjustable valves such as pulse width modulated valves. The basic refrigeration system also includes a recovery system which gathers the refrigerant at the outlet of the evaporator coil, compresses it back into a high pressure state and condenses it into a liquid phase to be used once again.

Thus the basic refrigeration cycle routes the gaseous refrigerant from the outlet of the evaporator coil to a compressor 14 which compresses the gaseous refrigerant, placing it at a substantially higher pressure, and raising its temperature. The high pressure, high temperature refrigerant, still in the gaseous phase, is then fed to a heat removal system where the high pressure refrigerant gas is allowed to condense into the liquid phase.

Ordinarily this heat removal system comprises another coil called the condenser coil 16. By locating the condenser coil in an ambient condition at a temperature lower than the temperature of the pressurized refrigerant, heat is extracted from the refrigerant, cooling it sufficiently to cause a transition to the liquid phase. From the outlet of the condenser coil, the liquid refrigerant may be stored in an optional liquid receiver tank 18 and thereafter recycled back to the expansion valve to begin the cycle once again.

The expansion of refrigerant from the liquid phase to the gaseous phase in the evaporator coil does not occur instantaneously. If one were to examine the interior of an evaporator coil 10 when the refrigeration cycle is operating, one would find at the inlet end (adjacent the expansion valve) some refrigerant would be in the gaseous phase and some would be in the liquid phase. As the refrigerant flows through the coil, more and more of the liquid will boil or evaporate into the gaseous phase, leaving less and less refrigerant in the liquid phase.

At some point (possibly within the coil or possibly beyond the coil outlet in the line leading to the compressor) the refrigerant will have finally completely evaporated to the gaseous phase. This point is called the dry out point. The dry out point is important because it marks the point at which the refrigerant can be elevated to a temperature above the saturation temperature or boiling temperature. This is called superheating.

To understand superheating one must recognize that in an enclosed system, such as in the evaporator coil, at constant pressure a boiling liquid will remain at a constant boiling temperature so long as there is some liquid remaining in the system. The boiling temperature is, of course, pressure dependent as dictated by thermodynamic laws. However, once all of the liquid refrigerant has boiled away, the gaseous refrigerant is now potentially able to absorb additional heat to increase in temperature above the boiling temperature.

When the gaseous refrigerant is in contact with liquid refrigerant, it is commonly said to be in the saturated state. In the saturated state the temperature of the gaseous refrigerant is the same as boiling temperature. Once all of the liquid has boiled away and if additional heat is added to elevate the temperature of the vapor above the boiling temperature, then the vapor is said to be superheated. The term superheat is used to denote the temperature difference between the vapor temperature and the saturation temperature (boiling point temperature).

By measuring the superheat of the refrigerant exiting the evaporator coil it is possible to acquire some understanding of how efficiently the refrigeration system is functioning. For example, if no superheat is achieved, then one can infer that the refrigerant is not fully evaporating in the evaporator coil. This, high concentration of liquid phase refrigerant in the outlet of the evaporator implies that liquid refrigerant could be fed to the compressor, a condition which greatly deteriorates compressor efficiency and can even cause compressor damage.

On the other hand, an excessively high superheat value implies that the evaporator coil could have accommodated more refrigerant, again an indicator of reduced efficiency. A design objective of a refrigeration control system is to meter precisely the right amount of refrigerant so that the entire length of the evaporator coil is used without flooding the coil with excessive refrigerant that may get passed to the compressor as liquid.

REFRIGERATION (AC) SYSTEM COMPONENTS

Having reviewed the basic principles of the refrigeration cycle, a presently preferred embodiment of the invention will be given. Although the invention can take many forms, it will be described in the refrigeration system of FIG. 2.

Figure 2:
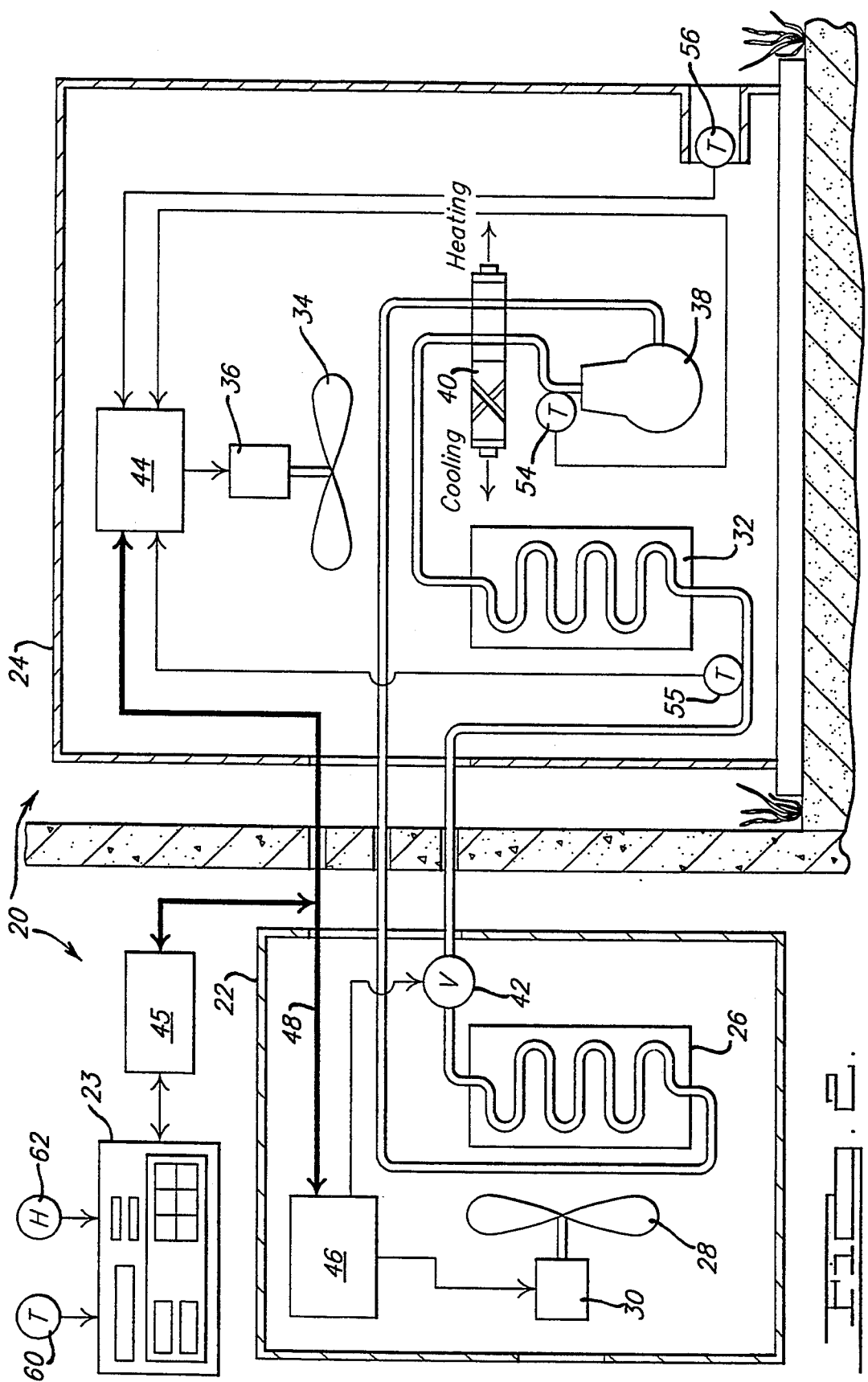
FIG. 2 is a schematic diagram of a preferred embodiment of the refrigeration control system of the invention, illustrated in a heat pump application.

With reference to FIG. 2, the refrigeration system is depicted generally at 20. The system includes an indoor unit 22 and an outdoor unit 24. The indoor unit includes an indoor coil or heat exchanger 26 and an indoor fan 28. The indoor fan is preferably driven by a variable speed motor 30. The indoor fan and coil are enclosed in a suitable cabinet so that the fan forces ambient indoor air across the indoor coil at a rate determined by the speed of the variable speed motor.

The outdoor unit includes an outdoor coil or heat exchanger 32 and an outdoor fan 34 driven by suitable motor 36. Preferably the outdoor unit comprises a protective housing which encases the outdoor coil and outdoor fan so that the fan will draw ambient outdoor air across the outdoor coil to improve heat transfer. The outdoor unit also houses compressor 38.

The system illustrated in FIG. 2 could be implemented as a so-called "heat pump" system capable of both cooling and heating, by simply reversing the function of the indoor coil and the outdoor coil. This is done with a four-way reversing valve 40. Referring to FIG. 2, when the four-way valve is set to the COOLING position (shown), the indoor coil functions as the evaporator coil and the outdoor coil functions as the condenser coil. When the four-way valve is switched to the HEATING position (the alternate position), the function of the coils is reversed. The indoor coil functions as the condenser and the outdoor coil functions as the evaporator.

In addition to the indoor and outdoor coils and the compressor, the present system also uses an electronically controllable expansion valve 42. In the presently preferred embodiment the expansion valve is a continuously variable (or incrementally variable) stepper motor valve which can be adjusted electronically to a wide range of orifice sizes or valve openings, ranging from fully open to fully closed. Although it is possible to implement the control system of the invention with other types of electrically controlled valves, pulse width modulated valves being an example, the present embodiment prefers the stepper motor valve because it provides ripple-free operation. The stepper motor valve only needs to move or cycle when an orifice size adjustment is made. This may happen several times during a typical operating sequence (e.g., several times per hour). In contrast, the pulse width modulated valve cycles continuously during the entire operating sequence.

DETAILS OF MICROPROCESSOR-BASED HARDWARE AND SOFTWARE

Figure 3:
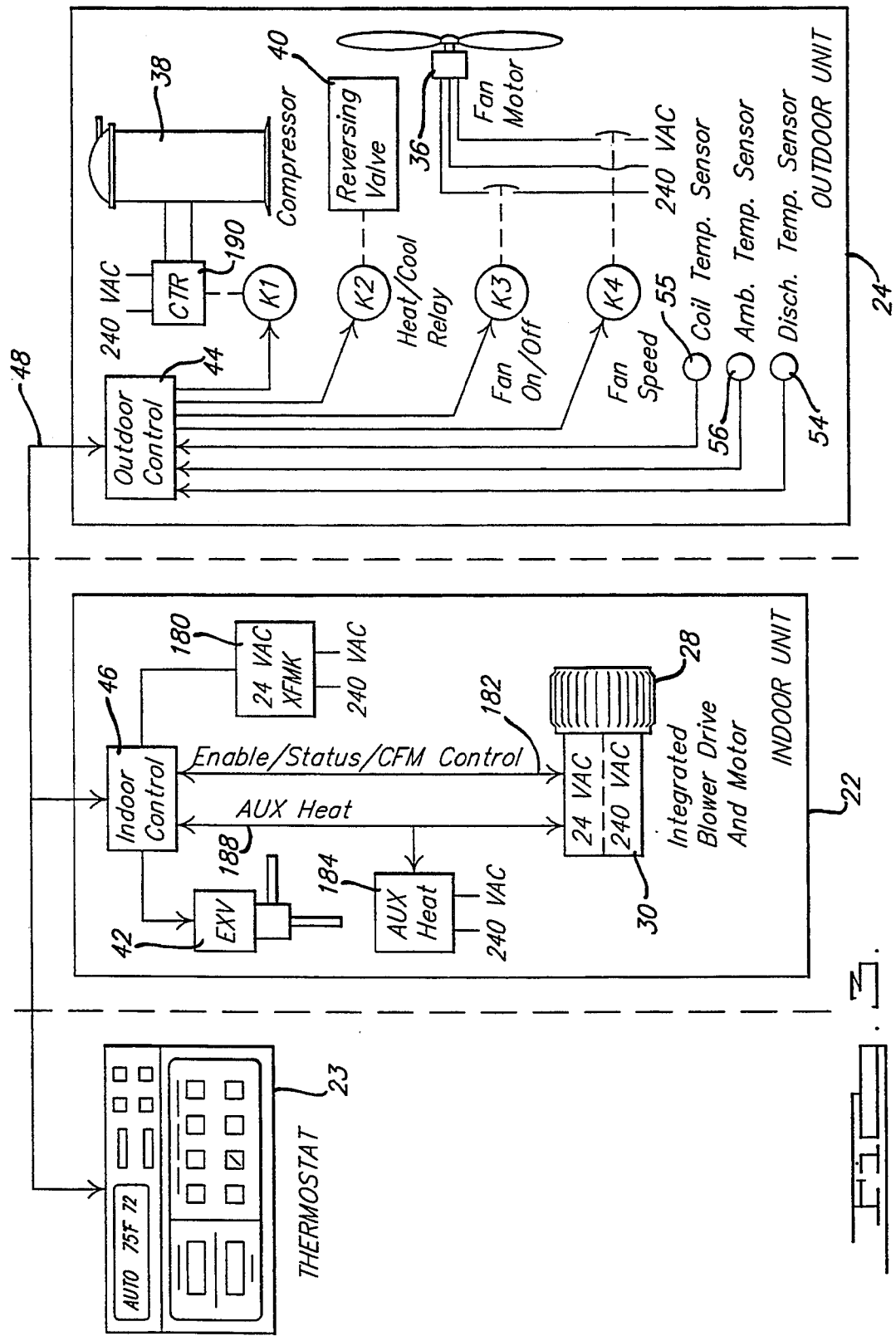
FIG. 3 is a block diagram of the presently preferred microprocessor-based system.

For convenience, the microprocessor-based control system used in implementing the refrigeration system of FIG. 2 is shown in FIG. 3. Specifically, the indoor unit 22, room unit or thermostat unit 23 and outdoor unit 24 are interconnected by communication link 48. Preferably communication link 48 is a four wire bus supplying AC power and ground to all three units and also providing a pair of serial communication data lines. The indoor unit 22, room unit 23 and outdoor unit 24 each have a microprocessor-based control unit which communicates with the other units over the communication link. In FIG. 3 the microprocessor-based control units 44 and 48 have thus been illustrated. The room unit 23 may also include a microprocessor-based control unit. The details have been omitted from FIG. 3 to simplify the illustration.

Also associated with the indoor unit 22 is the indoor fan or blower 28, which includes an integrated drive and variable speed motor 30. The presently preferred embodiment uses a motor which requires 240 VAC. Control signals and logic signals sent via communication link 48 are at 24 VAC and 5 VDC. A step-down transformer 180 is provided on the indoor unit for this purpose. Motor 30 receives its operating control instructions from and supplies status signals to the indoor control unit 46 at 24 VAC line levels over motor communication path 182.

The presently preferred embodiment uses electric resistance heaters to supply auxiliary heat. Indoor control unit 48 is responsible for determining when to turn the auxiliary heat on and off. This signal is supplied at 24 VAC logic levels. The indoor control unit 48 also supplies 24 VAC logic signals to control the expansion valve 42.

The outdoor unit also supplies and receives a number of different control signals at 24 VAC logic levels via the paths illustrated. For example, outdoor control unit 44 supplies the ON/OFF signal to compressor relay K1. This relay in turn energizes the compressor controller 190. The outdoor control unit 44 similarly supplies ON/OFF control signals to the heat/cool relay K2, which switches the reversing valve 40 as described above to place the system in either the HEATING or COOLING mode. The outdoor control unit supplies logic signals to the fan ON/OFF relay K3 and the fan speed relay K4. These relays in turn control the outdoor fan motor 36. In the presently preferred embodiment the outdoor fan motor 36 is a two speed motor. Outdoor control unit 44 also receives logic level data from the outdoor sensors, such as first temperature sensor 54, which measures the discharge temperature of the compressor, second temperature sensor 56, which measures the ambient or environment air temperature and coil temperature sensor 55, which measures the temperature of outdoor coil 32 (FIG. 2).

Figure 4:
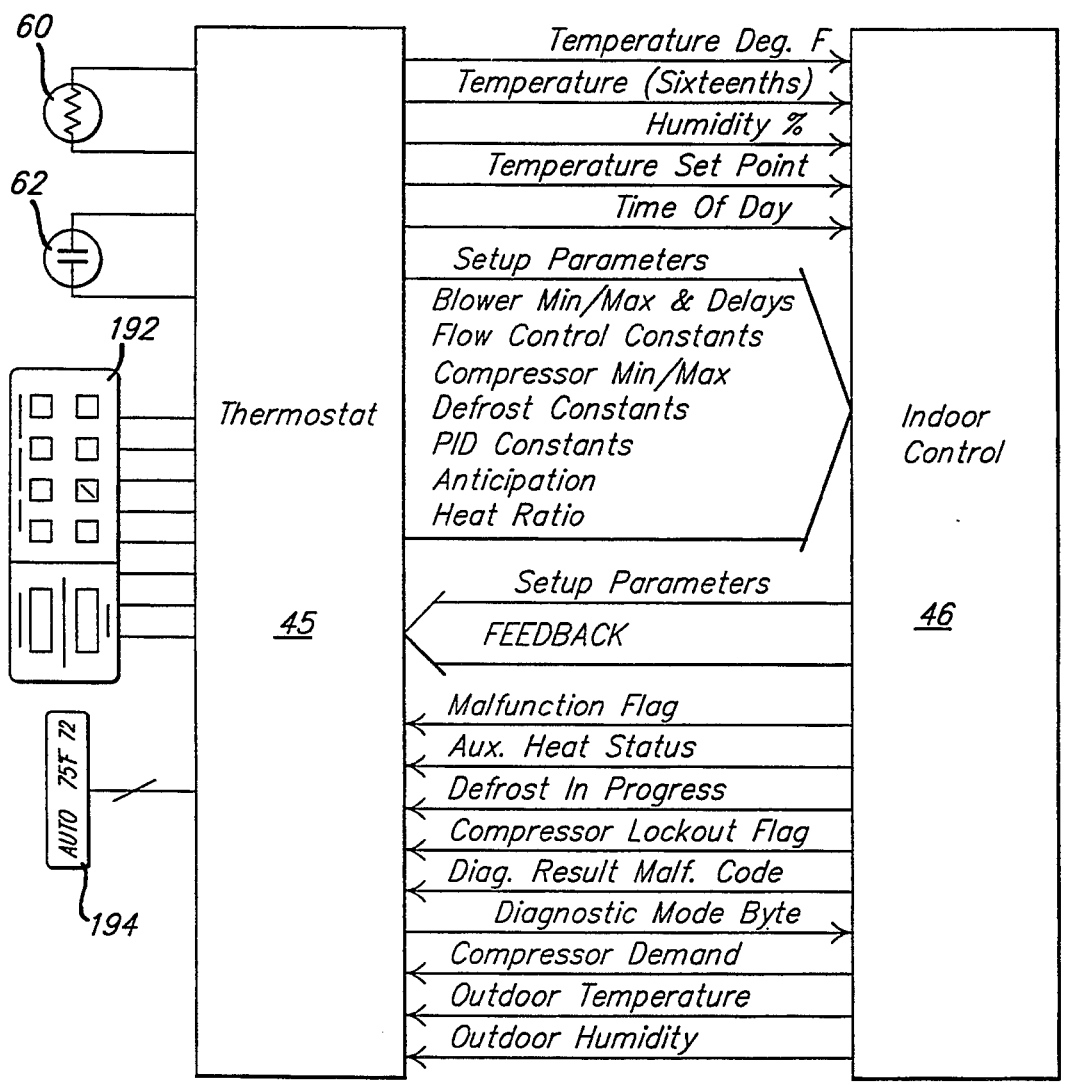
FIG. 4 is block diagram showing data flow between room unit (thermostat) and indoor unit.
Figure 5:
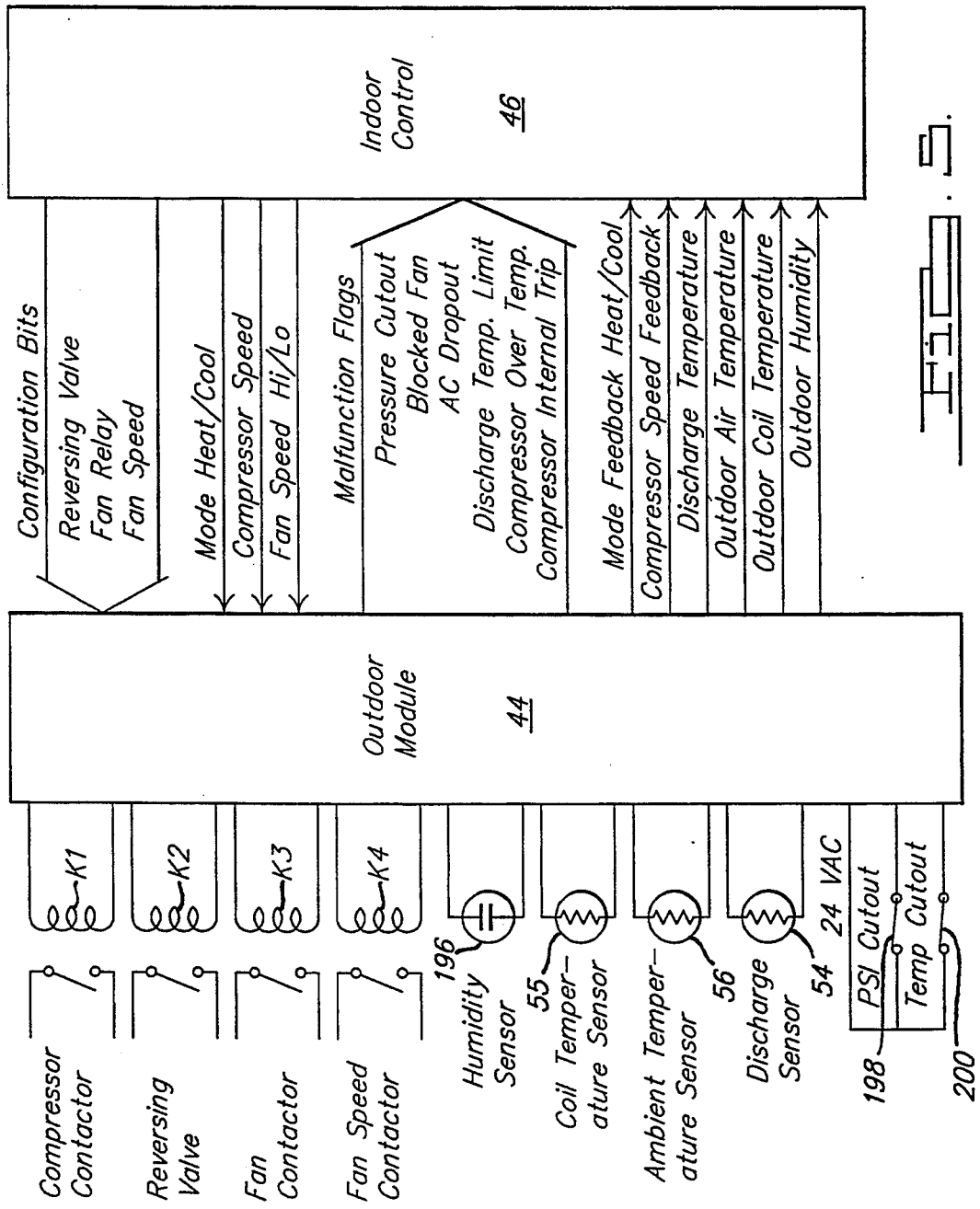
FIG. 5 is a block diagram showing data flow between indoor unit and outdoor unit.

Referring to FIGS. 4 and 5, the microprocessor-based control units 44, 45 and 46 are shown in somewhat greater detail to show the types of signals which are communicated between the units during operation.

In FIG. 4 the room unit control unit 45 is shown together with its associated keypad 192 and display 194. The keypad is coupled to the room unit control unit 45 via an eight line parallel data bus. The display is similarly coupled via a 36 line parallel data bus. Note the indoor temperature sensor 60 and indoor humidity sensor 62 are also coupled to the room unit control unit 45. Note, also that a humidity sensor 196 may also be employed in the outdoor unit (see FIG. 5) so that outdoor humidity can be measured. To protect the outdoor unit, a pressure cutout 198 and a temperature cutout 200 are provided.

In reviewing FIGS. 4 and 5 it should be kept in mind that the presently preferred interunit communication is done via the serial communication link 48. It is the nature of serial communication that the communication line is shared by all units and thus only one message is communicated at a time. Thus in FIGS. 4 and 5, the itemized data flow between room unit control unit 45 and indoor control unit 46 and between outdoor control unit 44 and indoor control unit 46 are shown to illustrate the type of information which is passed back and forth during system operation. Although FIGS. 4 and 5 illustrate this transfer of data as a parallel operation, and it could be implemented in a parallel communication link, the present embodiment prefers a serial link.

To transfer this much information back and forth during system operation the microprocessor-based systems send and acknowledge messages in a serial fashion according to a predefined protocol. Each of the three units has sufficient random access memory, and in some cases nonvolatile memory, in which to store the various parameters which comprise the information communicated between them. Thus, for example, the outdoor humidity measured by sensor 196 is stored in the random access memory of outdoor control unit 44, to be thereafter communicated to indoor control unit 46 where it is stored in the random access memory of control unit 46. Thereafter, the same outdoor humidity data may be communicated to the room unit where it is stored in the room unit control unit's random access memory. The building occupant could then, if desired, enter the appropriate keypad function to request a display of the outdoor humidity. This is but one example of how data flows from module to module. By using interim storage in each of the modules, each module is able to handle its own system critical tasks with high priority, attending to the noncritical tasks only when there is time. Thus the building occupant requesting a display of outdoor humidity would not cause the outdoor module to neglect its task of controlling the compressor and likewise would not cause the indoor unit to neglect its task of regulating the fan speed. The building occupant requesting and outdoor humidity display would see a humidity value displayed instantly, although the value displayed would be the value obtained during the most recent data refresh sequence.

Tables I and II below illustrate the presently preferred communication protocol by which the three control units communicate. Communication between the indoor control unit and room control unit comprise a series of status requests and status replies and parameter requests and parameter replies. Similarly, communication between the indoor control unit and the outdoor control unit comprise a series of command updates, status requests and status replies. The information given in Table I is of a general nature, showing the basic handshaking protocol employed. The protocol is implemented by a series of messages back and forth between the various units. Table II gives greater detail about the presently preferred message format. Tables I and II may be read together using the key numbers appearing in circles on both Tables. Thus a status request from the indoor control unit to the room control unit (designated by the key number ①) can be readily found in both Tables. Thus the Status Request message ① is found in both Table I and Table II. Table II gives the presently preferred message format sequence used to identify a Status Request message. From Table II the Status Request message from indoor control unit to room control unit is 81 194 19. This is a fairly short message. Other messages, such as a Status Reply ② are considerably longer and convey considerably more information.

With reference to Table II it will be seen that some messages, such as those with key numbers ①, ④, ⑤ and ⑧ are simple messages which do not convey data. The remaining messages are more complex since they convey numerical data. These more complex messages each being with two byte header (e.g., message ① begins with the bytes 81 194) used to identify the type of message and its intended recipient. In addition, these more complex messages also end in a single byte check sum (e.g. message ③ ends in check sum 223). The bytes between the header and the check sum comprise numerical data that is being transferred by the message. In Table III a brief description of each byte of data is given. For example, in message ② the humidity set point is indicated at 80, the humidity percent is indicated at 70, and so forth. Table III defines the abbreviations used in Table II. The numerical data values shown in Table II are merely exemplary of typical operating data. Different numerical data may obtain during system operation.

Some of the message bytes in Table II have been designated as FLAG data. These data typically comprise ON/OFF or TRUE/FALSE Boolean data capable of being conveyed by binary numbers. To save storage space and shorten communication time, these Boolean data are combined on a bitwise level into the various FLAG bytes. For example, in message ②, the FLAG bit in the bit 7 column designates whether manual mode or normal mode is invoked. Bit 6 conveys whether the system is in power-up mode or key press mode. Bit 3 tells whether the blower is on or off. Reference may be had to Table III for the abbreviations used in describing these FLAG bits.

Figure 6:
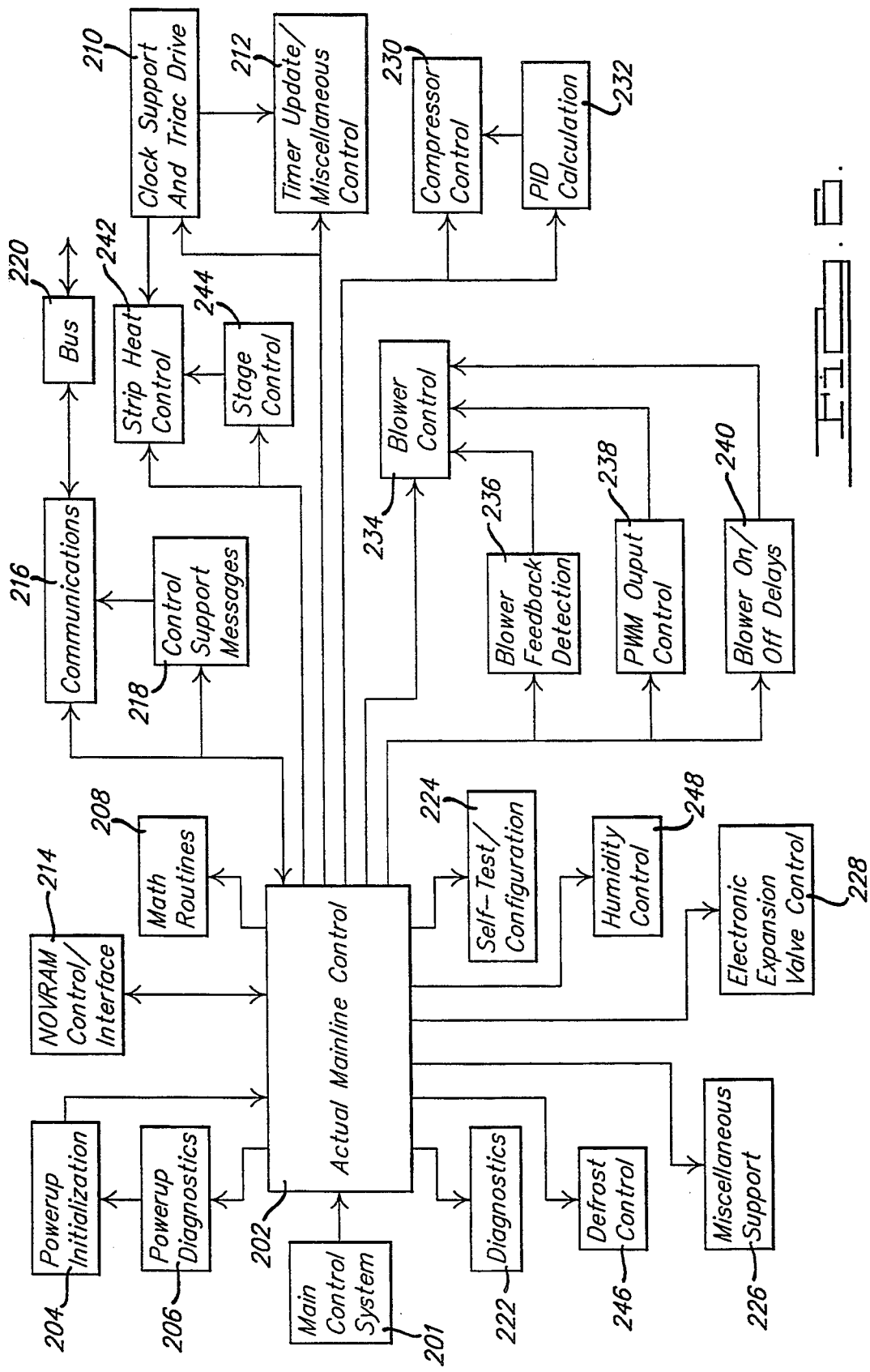
FIG. 6 is a software block diagram of the preferred software embodiment.

The indoor control unit 46 functions as the master, controlling the overall system performance and much of the communication among the three control units. FIG. 6 is a software block diagram illustrating the functional software elements which comprise the present control system. Because the indoor control unit functions as the master in the presently preferred embodiment, many of the software modules of FIG. 6 reside in and are performed by the indoor control unit 46. Of course, from a system standpoint, any one of the microprocessor-based modules could serve as the master. In addition, the software functions depicted in FIG. 6 could be distributed across or shared by all three control units. Thus the specific allocation of certain functions to certain ones of the control units adopted by the present embodiment should not be viewed as a limitation upon the scope of the claims.

Referring to FIG. 6, at the heart of the software control system is the mainline control block 202. This block or module interfaces, either directly or indirectly, with each of the remaining blocks or modules. The mainline block 202 is supervised by the main control system block 201, which supplies the global system performance requirements. The mainline control block is responsible for effectuating the instructions of the main control system by interfacing with the other modules. For example, the power up initialization and power up diagnostics blocks are called by the mainline control block during initial power up. The mainline control block has access to a math routines block 208 which is called upon anytime math calculations take place. Similarly, mainline control block 202 has access to the clock support and triac drive block 210 and the timer update/miscellaneous control block 212, which are used anywhere timing of events is involved.

The system is adaptive, in that it is capable of continuously updating parameters during normal operation. At initial power up, however, the system uses preset starting parameters which are stored in a nonvolatile RAM or NOVRAM memory that is accessed via the NOVRAM control/interface block 214. The nonvolatile RAM may also store other numerical values such as constants which are not ordinarily altered during system operation. The use of nonvolatile RAM for this purpose is quite advantageous, since it allows a standardized hardware system to be custom programmed in the factory before shipment. This allows a more or less standard control module package to be used for a wide range of different heating and cooling systems by simple in factory programming. This results in a considerable cost savings.

Communications and message handling is provided by the communications block 216 and the control support messages block 218. These blocks implement the communication protocol described in Tables I-III. The actual details regarding the manner in which messages are placed on the communication link are handled by the bus block 220. System diagnostics are performed by block 222. If desired, the system may be programmed to perform self-tests and self-configuration. This is performed by block 224. In addition, any miscellaneous support functions which do not fit the other described categories may be called by the mainline control block. For illustration purposes, the miscellaneous support block 226 is thus shown.

Mainline control block 202 is further responsible for the important functions of controlling the refrigeration system components, the indoor fan and any auxiliary heating equipment. With respect to the refrigeration system components, an electronic expansion valve control block 228 is provided. This block is responsible for determining and effecting the setting of the expansion valve. Similarly, the compressor control block 230 is provided for turning the compressor on and off via relay K1. A PID algorithm implemented in block 232 provides the adaptive control by which the system updates it parameters during operation.

Regarding the fan speed control, the blower control block 234 receives instructions from blower feedback detection block 236, pulse width modulation output control block 238 and blower ON/OFF delay block 240. The presently preferred indoor fan motor is driven by a pulse width modulation system by which the pulse width of the motor drive signal is varied to modulate the speed. The pulse width modulation output control block 238 and blower feedback detection block 236 provide the pulse width modulated closed-loop system function. The blower ON/OFF delay block 240 alters the ON/OFF sequence of the indoor fan to optimize airflow in relation to the temperature of the heat exchanging elements.

In systems which use auxiliary heat, such as resistance heating elements, the strip heat control block 242 and stage control block 244 are provided. The strip heat control block is responsible essentially for activating one or more relays to turn on the auxiliary heating elements. The stage control block causes the strip heat control block to do so in stages based on the desired temperature and how much heat is required.

The presently preferred embodiment uses a demand defrost cycle to periodically melt accumulated frost on the coil. This is handled by the defrost control block 246. In addition, fan speed may be regulated to control humidity or to maintain system operation within the ASHRAE comfort zone. This is handled by the humidity control block 248.

As described above the presently preferred control system is a microprocessor-based system which gathers data from various sensors and which determines the proper setting of the expansion valve based on the data gathered. More specifically, the presently preferred embodiment uses two microprocessor-based control units 46 and 44, one associated with the indoor unit and one associated with the outdoor unit, respectively. In addition, the room unit or thermostat unit 23 may also include a microprocessor-based control unit 45. Preferably, all three microprocessor-based control units are linked together via a suitable communication link 48 such as a parallel or serial communication link. The outdoor control unit 44 is largely responsible for data collection while the indoor control unit 46 is responsible for: on/off cycling of system, modulating the indoor fan speed, control of expansion valve, start/termination of demand defrost malfunction detection and performing system.

OVERCHARGE-UNDERCHARGE DIAGNOSTIC SYSTEM

Figure 8:
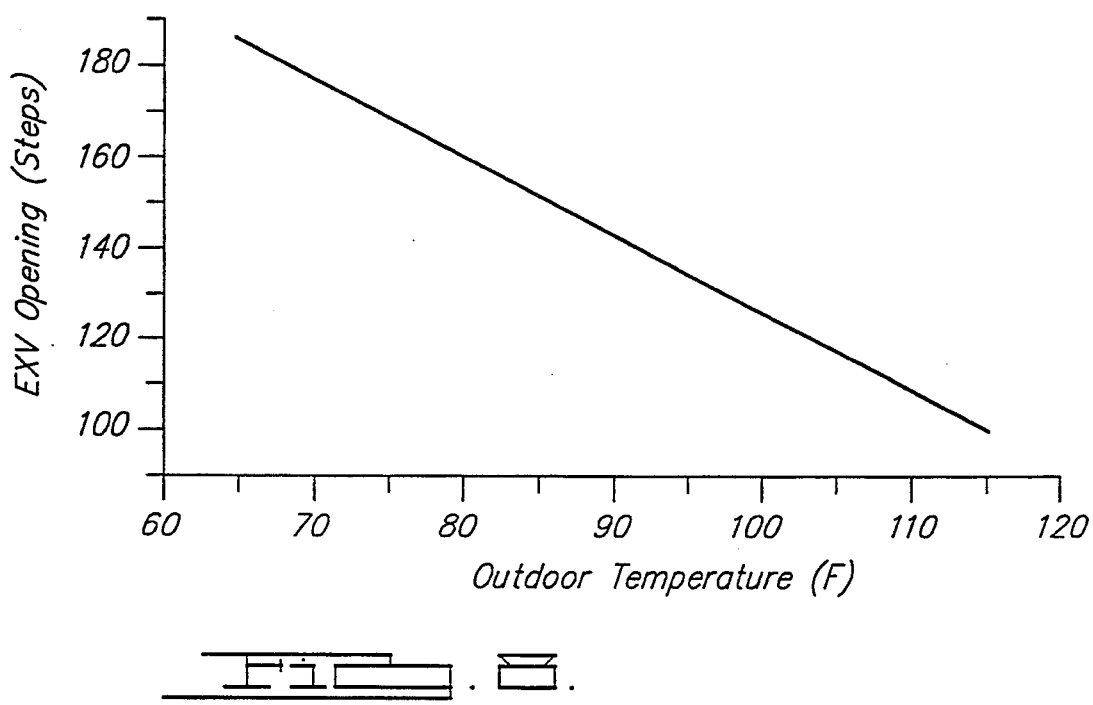
FIG. 8 is a graph illustrating the presently preferred expansion valve opening versus outdoor temperature.
Figure 9:
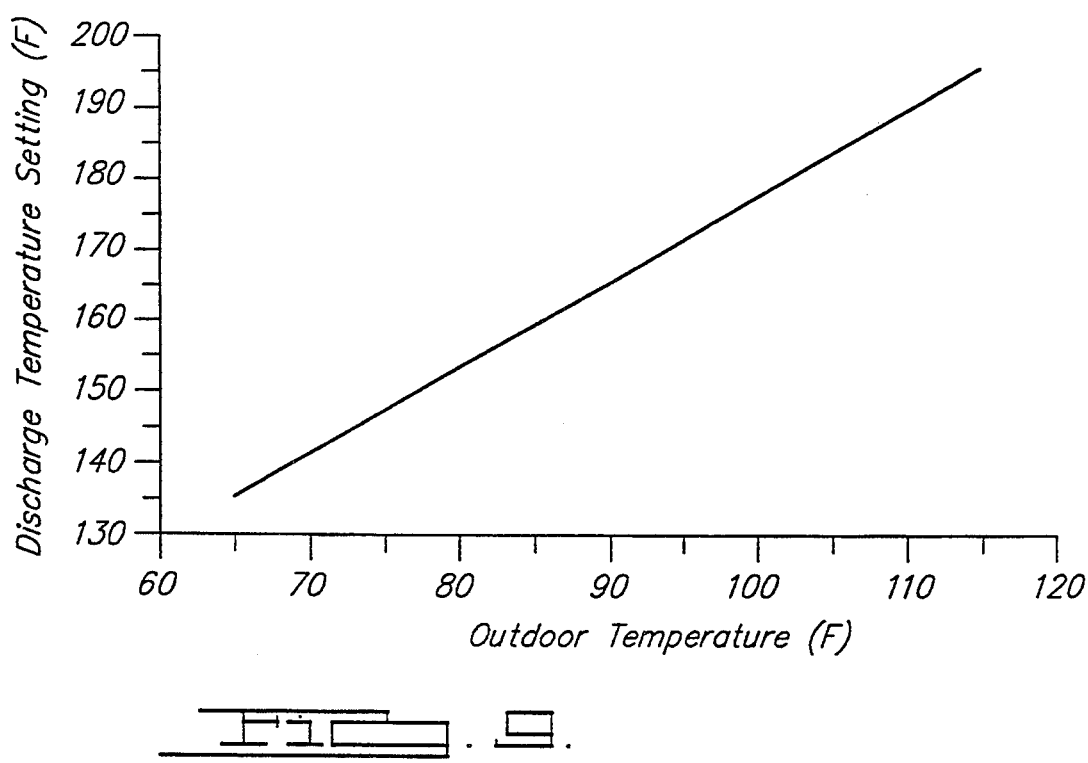
FIG. 9 is a graph illustrating the compressor discharge temperature versus outdoor temperature for properly charged system.

The overcharge and undercharge system conditions may be detected by periodically setting the expansion valve to a known opening which varies with outdoor temperature (see FIG. 8) and then comparing the steady state compressor discharge temperature response with the built-in reference steady state discharge temperature for a given outdoor temperature (see FIG. 9).

Figure 7A:
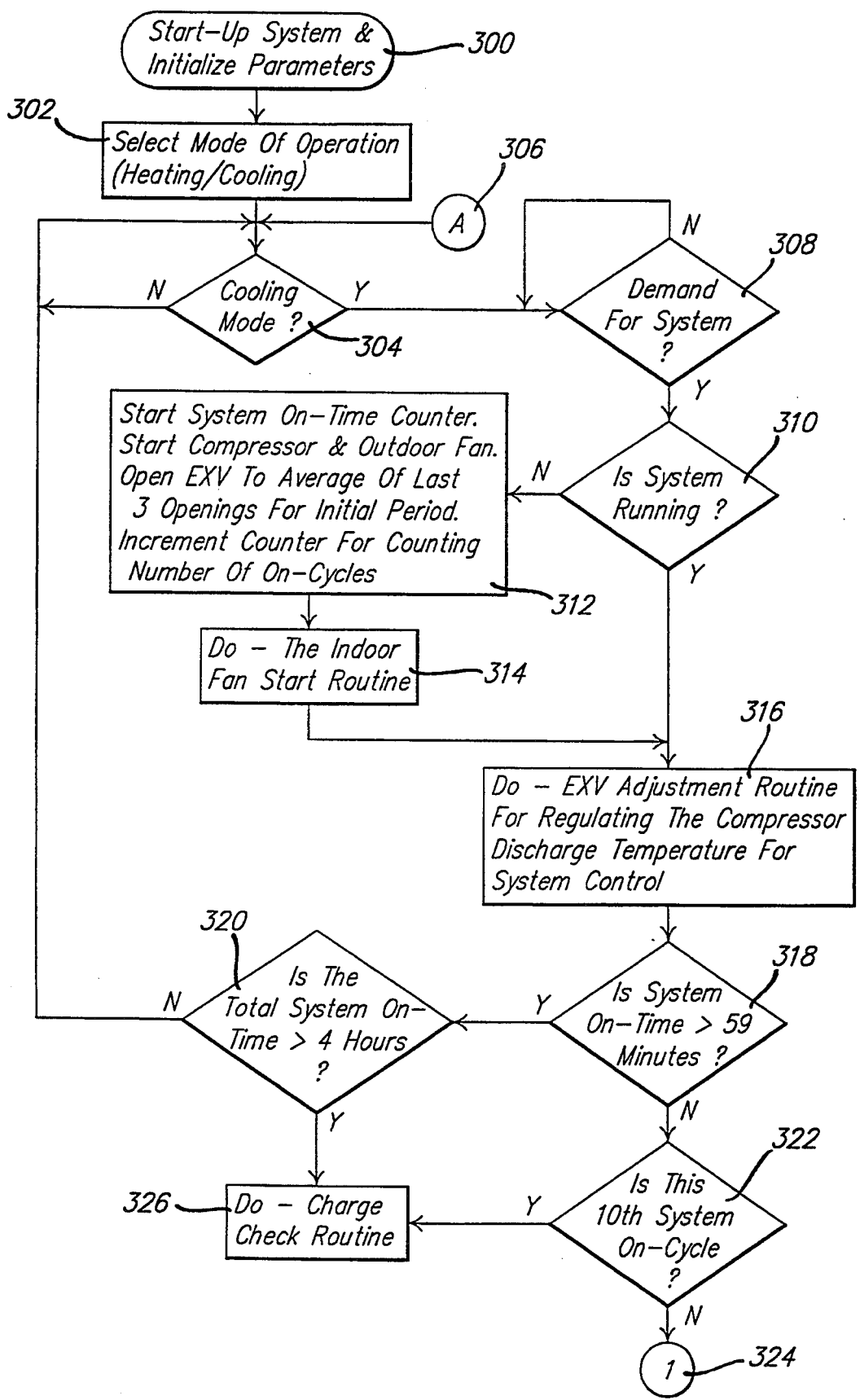
FIG. 7 (7a–7d) is a flowchart illustrating the presently preferred undercharge and overcharge diagnostic system of the invention.
Figure 7B:
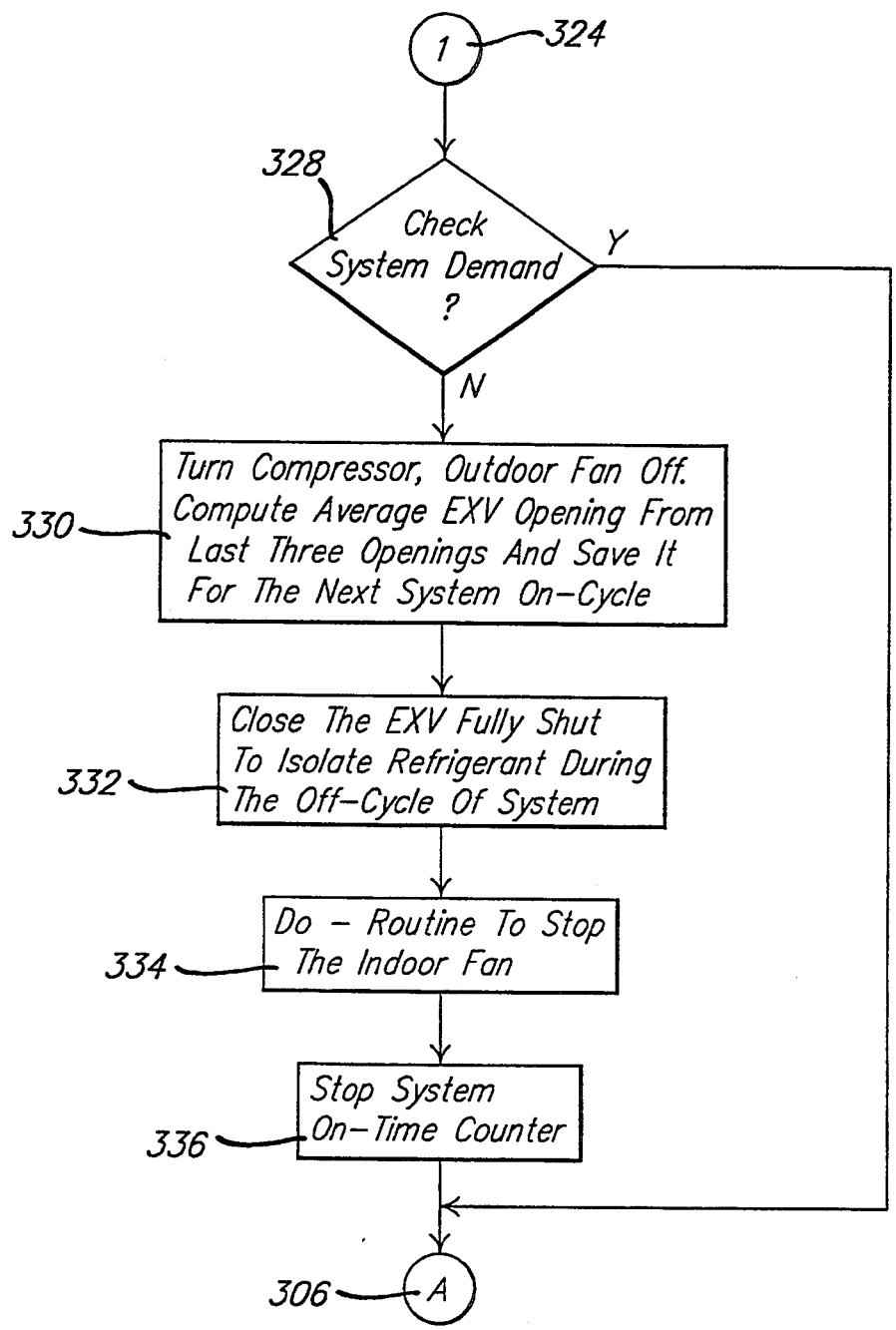

Referring to FIG. 7, which collectively comprises FIGS. 7a–7d, the presently preferred diagnostic system is illustrated. In the presently preferred implementation the diagnostic system or Charge Check routine is embedded in the software-implemented refrigeration system control routines. Accordingly, in addition to illustrating the presently preferred Charge Check routine in FIGS. 7c and 7d, the overall software system architecture is also illustrated (FIGS. 7a and 7b).

Referring first to FIG. 7a, the software system architecture begins at step 300 with a startup system and initialize parameters step. Thereafter, at step 302, the mode of system operation (i.e. heating or cooling) is selected. This is based on the user's selection entered through the thermostat unit 23. If the cooling mode has been selected, determined at step 304, and if there is demand from the system for cooling, determined at step 308, the procedure proceeds to perform the expansion valve control routine which is responsible for ensuring that the proper refrigerant flow circulates within the refrigeration system. More specifically, if the system is already running as determined at step 310, then control proceeds directly to the expansion valve (EXV) adjustment routine 318. The presently preferred expansion valve adjustment routine regulates the valve setting based on compressor discharge temperature and outdoor air temperature. On the other hand, if the system is not already running as determined at step 310, a series of system startup steps 312 and 314 are performed as illustrated.

While operating in the cooling mode the control program spends much of its time at step 316, controlling the expansion valve setting to maintain the system at proper steady state operating conditions. While performing the expansion valve routine the system periodically jumps to a Charge Check routine. Specifically, during system operation a system On-Time clock is maintained. In addition a counter is maintained to keep track of how many On cycles have been performed. As illustrated at steps 318, 320 and 322, the Charge Check routine is called at step 326 after every 10th system On cycle within the first 59 minutes and after every 4 hours of system On-Time.

The state of the On-Time counter is controlled during the normal system Off cycle as illustrated in FIG. 7b. In this regard, it will be understood that FIG. 7b comprises part of the system control program and is specifically attached to FIG. 7a at nodes A and 1 (see reference numerals 306 and 324).

Referring to FIG. 7b, if there is no demand for system cooling when step 328 is entered, the compressor and outdoor fan are turned off at step 330 and an average expansion valve setting is computed for use during the next system On cycle. Then at step 332 the expansion valve is shut fully to isolate refrigerant during the Off cycle. The indoor fan is then stopped at step 334 and the system On-Time counter is stopped. Control then returns to node A, reference numeral 306 in FIG. 7a.

Figure 7C:
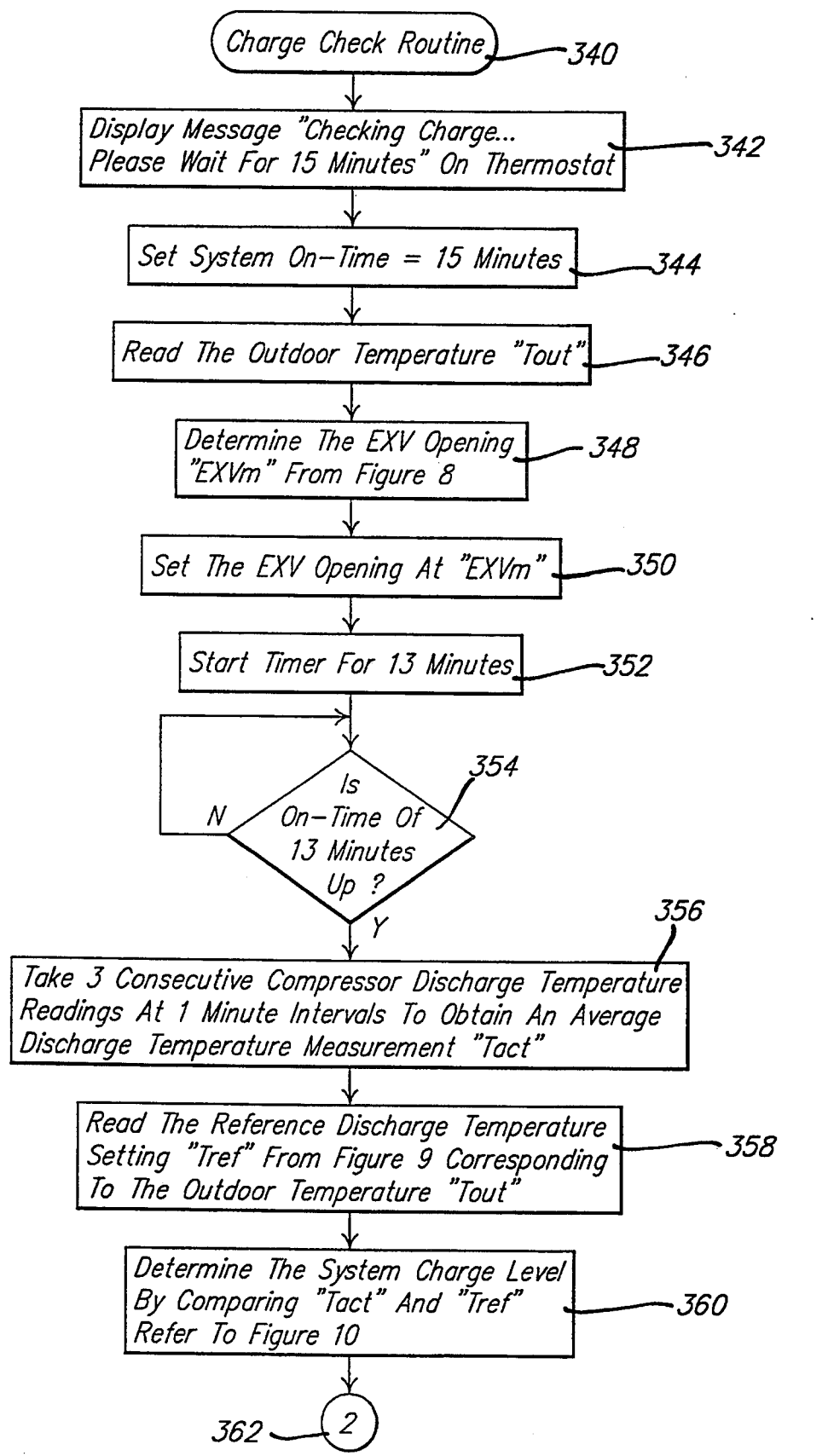

Having described the overall system software architecture, the Charge Check routine will now be described. Referring to FIG. 7c, the Charge Check routine or diagnostic routine begins at step 340 and proceeds in step 342 to display a message on the LCD display of the thermostat unit to inform the user that the Charge Check routine is being performed. The presently preferred Charge Check routine takes approximately 15 minutes, which time is controlled by setting the system On-Time to 15 minutes at step 344. Next the outdoor temperature is read at step 346 and assigned to variable Tout. Then, using a stored look-up table and expansion valve setting EXVm is determined. The presently preferred expansion valve opening is a function of outdoor temperature illustrated in FIG. 8. In the presently preferred embodiment the data stored in the look-up table represents the data illustrated in the graph of FIG. 8.

Figure 10:
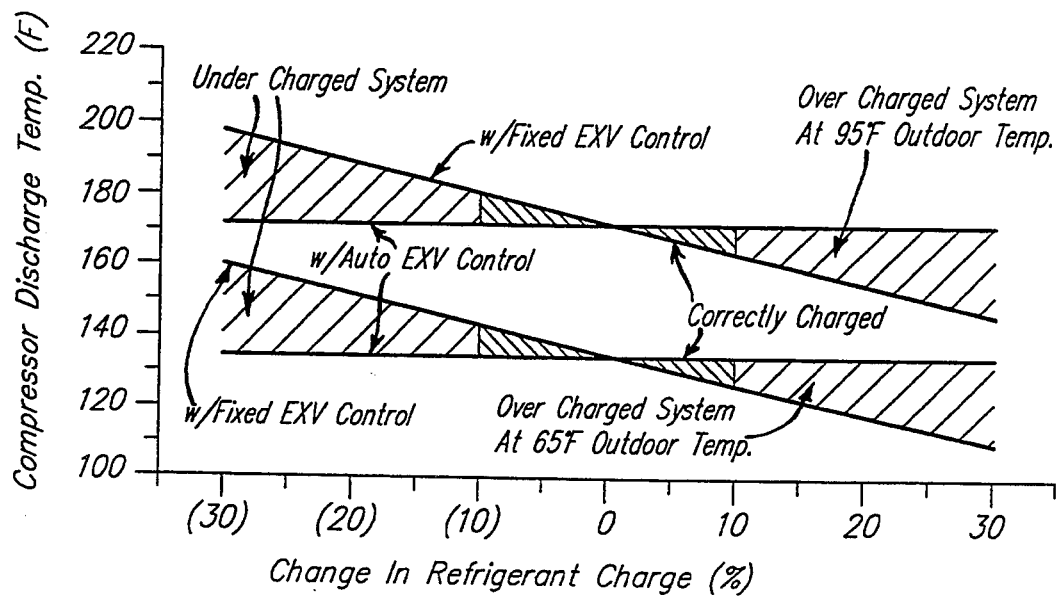
FIG. 10 is a chart showing the relationship between the discharge temperature and various refrigerant charge levels for two outdoor temperature conditions (65° F. and 95° F.) with fixed and automatic EXV control. Similar relationships may be derived for other outdoor temperatures to cover the typical operating range of an air conditioner for detecting the refrigerant level.
Figure 11:
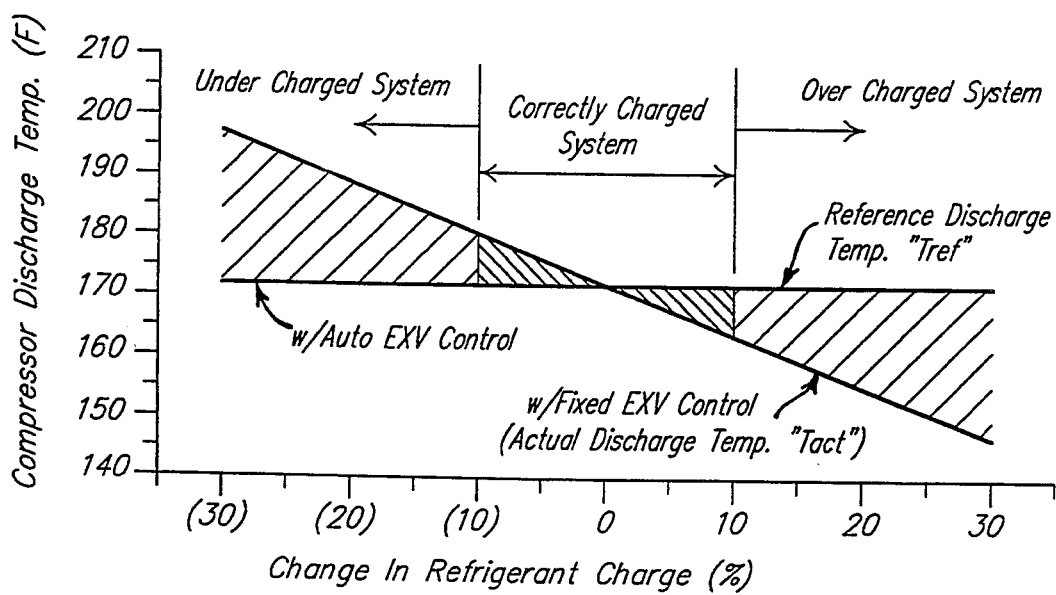
FIG. 11 is a chart, similar to that of FIG. 10, showing the 95° F. condition in greater resolution.

After determining the appropriate expansion valve opening, the valve is set to that setting at step 350 and a 13 minute timer is started at step 352. As illustrated at step 354, the Charge Check routine or diagnostic routine waits for the 13 minute timer to elapse and then causes the system to take 3 consecutive compressor discharge temperature readings at 1 minute intervals. These readings are used to obtain an average discharge temperature measurement Tact. See step 356. Then, the outdoor temperature stored in variable Tout is used to access a second look-up table containing reference discharge temperature values. This is illustrated at step 358. The presently preferred look-up table corresponds to the data depicted in FIG. 9. The value obtained from the look-up table corresponding to FIG. 9 is then stored as variable Tref. Then, at step 360, the stored variables Tact and Tref are compared. If the Tact and Tref values are not within a predefined proximity to one another an undesired refrigerant charge condition (overcharge or undercharge) is declared. In this regard, reference may be had to FIGS. 10 and 11 which graphically show the comparison step 360. As illustrated in FIGS. 10 and 11, the presently preferred embodiment treats a change in refrigerant charge of less than ±10% to represent a correctly charged system. When Tact is less than Tref an overcharge condition is declared. When Tact is greater than Tref an undercharge condition is declared.

Figure 7D:
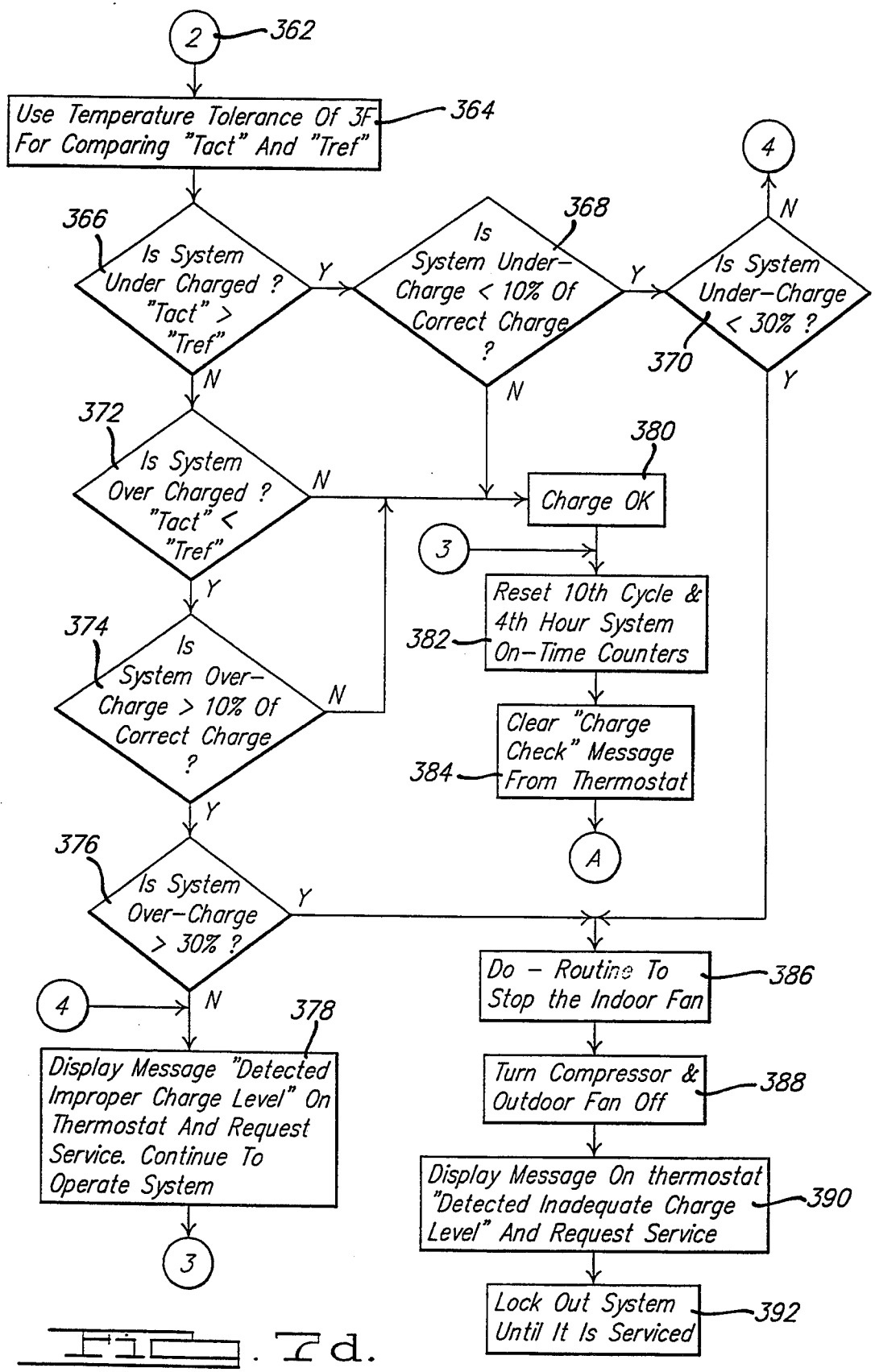

The presently preferred routine by which the overcharge and undercharge conditions are discriminated is illustrated in FIG. 7d. It will be understood that the flowchart of FIG. 7d is attached to and forms a part of the Charge Check routine algorithm illustrated in FIG. 7c. See reference numeral 362. As illustrated at step 364, the presently preferred routine uses a temperature tolerance of 3° F. for comparing Tact and Tref. In other words, differences between the variables of less than 3° F. are ignored. If the actual measured value Tact is greater than the reference value Tref, then the system is further tested to see if an undercharge condition should be declared. Conversely, if Tact is less than Tref, then a potential overcharge condition is investigated beginning at step 372. The procedures for determining whether to declare an overcharge or an undercharge condition are similar. In step 368 (applicable to the undercharge test) and step 374 (applicable to the overcharge test) a 10% factor is used. Thus if Tact is greater than Tref by 10% or more, an undercharge condition is declared at step 368. Similarly, if Tact is less than Tref by 10% or more, an overcharge condition is declared at step 374.

If the overcharge or undercharge condition, so determined, does not exceed 30%, then a message is displayed on the LCD of the thermostat at step 378. The message advises the user that an improper charge level has been detected. Although this constitutes an undesired refrigerant charge condition, the system will continue to operate. On the other hand, if the overcharge or undercharge condition exceeds 30%, the system will shut down by executing routine 386 which stops the indoor fan, step 388 which turns off the compressor and outdoor fan, step 390 which displays a message that an incorrect charge level has occurred and step 392 which locks out the system until it is serviced. Thus if Tact is greater than or less than Tref by 30% or more, the system is shut down so that any damage to the system may be prevented.

The charge detection logic may be further explained by an illustrative example. In this example, Tact is the actual compressor discharge temperature and Tref is the reference compressor discharge temperature derived from FIG. 9. The Charge Check routine reads the outdoor temperature of 95° F. and sets the electronic expansion valve (EXV) at a fixed opening of 134 steps and determines the reference discharge temperature Tref as 172° F. from FIG. 9. The routine waits for the system conditions to stabilize. At the end of stabilization period of 15 minutes the algorithm compares the value of Tact (let us assume it is 175° F.) against the value of Tref of 172° F. The logic will find the system to be properly charged since it is within the ±3° F. compressor discharge temperature tolerance provided to account for the measurement errors and system dynamics.

An additional ±10% charge tolerance has been provided around the correct system charge. This feature is expected to prevent any nuisance service calls arising from minor undercharge or overcharge situations. Thus, the logic considers the system to be properly charged if the discharge temperature Tact is in the range of: 164° F. to 180° F. at the outdoor temperature of 95° F. Furthermore, the algorithm considers the system to have lost 30% charge if the discharge temperature Tact is found to be 197° F. ±3° F. The logic will shut the unit and display a message on thermostat requesting service work. Similarly, if the logic will declare the unit to be overcharged if it finds that Tact to be at 110° F. ±3° F.

Relationships similar to those for the outdoor temperatures of 65° F. and 95° F. (refer to FIG. 10) can be developed which would cover the outdoor conditions of the air conditioner for detection of the charge.

Figure 12A:
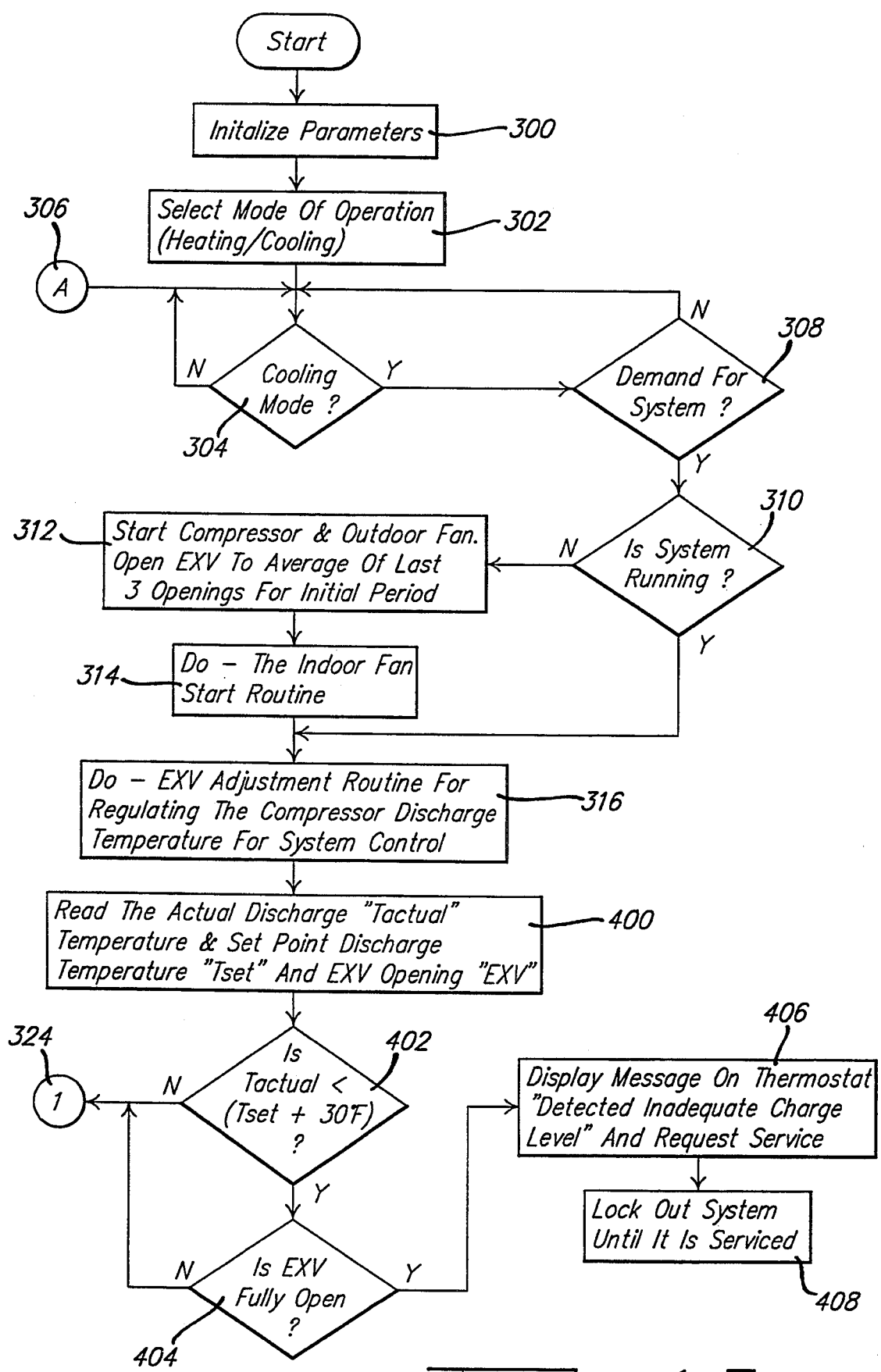
FIG. 12 (12a–12b) is a flowchart illustrating an alternate embodiment of the invention.
Figure 12B:
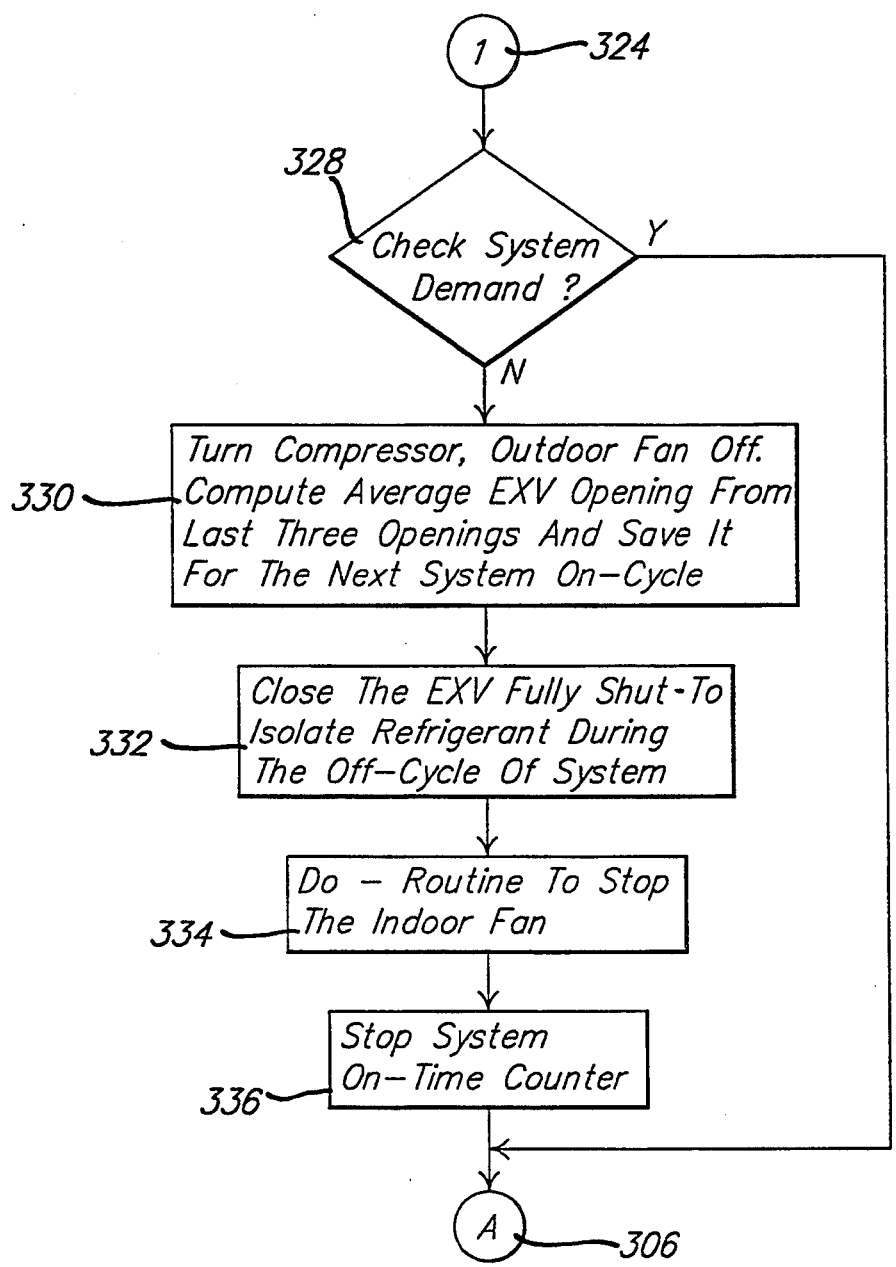

Although the presently preferred embodiment is capable of detecting both overcharge and undercharge conditions using a technique whereby the expansion valve is periodically set to a predetermined position, other routines are also possible. As illustrative of an alternate embodiment reference may be had to FIG. 12, which collectively comprises FIGS. 12a and 12b. As illustrated in FIG. 12a steps 300 through 316 are essentially the same steps as described in connection with FIG. 7a and steps 324 through 336 are essentially the same steps as described in connection with FIG. 7b. In step 400 the actual compressor discharge temperature Tactual is red and the setpoint discharge temperature Tset is obtained from a look-up table or the like. In addition, the actual setting of the expansion valve is determined and assigned to variable EXV. In this regard, the presently preferred expansion valve is controlled by a stepper motor, and the physical stepper motor position can be used as an indication of expansion valve setting.

Next, at step 402 the actual discharge temperature is compared with the setpoint discharge temperature. If the actual discharge temperature is less than the setpoint discharge temperature +30° F. and if the expansion valve is already fully open as determined by step 404, then an inadequate or undesired charge level condition is declared with the appropriate message being displayed at step 406. Thereafter, the system is locked out at step 408.

While the invention has been described with respect to a presently preferred heat pump embodiment, it will be understood that the invention can be applied to numerous forms of air-conditioning systems and refrigeration systems. Accordingly, the principles of the invention are not limited to the embodiment described. The invention is capable of certain modification and change without departing from the spirit of the invention as set forth in the appended claims.

TABLE I

| Room Control Unit | Indoor Control Unit | Outdoor Control Unit |
|---|---|---|

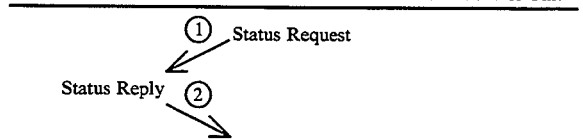

TABLE I-continued
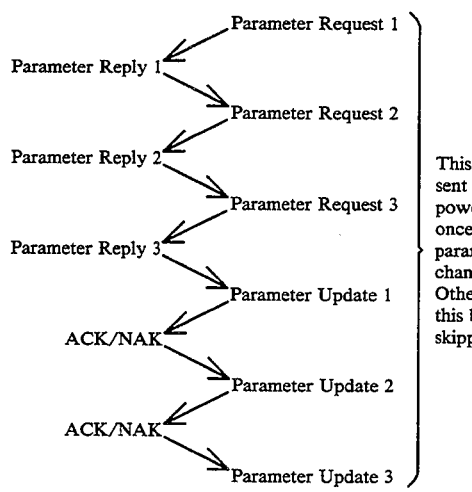
This block is sent once on power-up and once anytime parameters are changed. Otherwise, this block is skipped.
TABLE I-continued
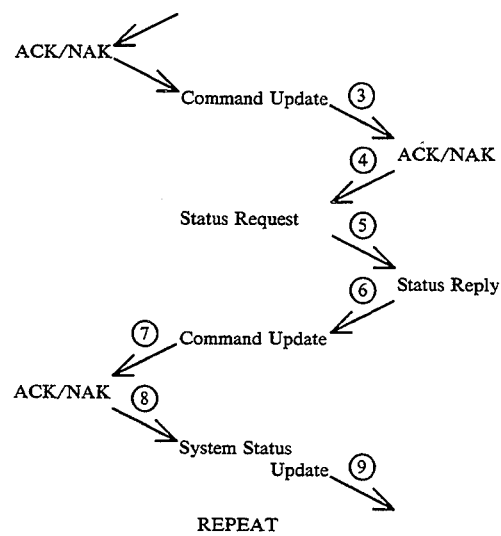
REPEAT

TABLE II

Enhanced Single Speed Message Format For Versions COPE1-27 And Above

| KEY | | | | | | | | | |
|---|---|---|---|---|---|---|---|---|---|
| | | | INV SPD OUT FAN | | | | | STP HT | EEV POS |
| | | | 70 HUM % | 13 HR | 5 MIN | 76 TEMP WHOLE | 176 TEMP FRACT | 76 SET PT | 64 NXT PRG TIME | 70 NXT PRG ST PT |
| ① From Indoor To Thermostat | 81 | 194 | 19 | | | | | | | |
| ② From Thermostat To Indoor | 21 | 66 | 80 HUM SET PT | | | | | | | |
| | | | | | | | | | | BLWR SPD |
| | | | | CONFG | MODE | INV FRQ | FAN SPD | | | 0 BLWR SPD | 0 DIAG MODE | 98 FLAG |
| ③ From Indoor to Outdoor | 92 | 131 | 0 | 0 | 0 | 0 | 0 | | | 0 | 0 | 0 |
| ④ From Outdoor to Indoor | 197 | 6 | 203 | (Acknowledge; Above Message Received Okay) | | | | | | | | | 223 |

128 BIT 7 MNUL MODE = 1/NORM = 0
64     6 PWR UP = 0/KEY PRES = 1
32     5 CMFT = 1/ECON = 0
16     4 PARAMETER SETUP = 1
8      3 BLOWER ON = 1

4 2 LOCKOUT OVRIDE = 1
2   1 0 0 1 1   MODE
1   0 0 1 0 1   MODE
    OFF   EMER
         COOL  HEAT

|   |   |   |   | MODE | INV FRQ | MALF | SUCT TEMP | DSCH TEMP +55 | OTDR AMB −77 | OTDR COIL 1 −77 | OTDR COIL 2 | CRNT | OTDR % HUM |
|---|---|---|---|---|---|---|---|---|---|---|---|---|---|
| ⑤ From Indoor To Outdoor | 92 | 195 | 31 | | | | | | | | | | |
| ⑥ From Outdoor To Indoor | 197 | 67 | 0 | 0 MODE | 0 INV FRQ | 0 MALF | 0 SUCT TEMP | 115 DSCH TEMP +55 | 149 OTDR AMB −77 | 142 OTDR COIL 1−77 | 0 OTDR COIL 2 | 0 CRNT | 158 OTDR % HUM |
| ⑦ From Indoor To Thermostat | 81 | 130 | 0 SET PT OVRIDE | 0 | 0 FLAG | 0 DIAG | | | | | | | |
| ⑧ From Thermostat To Indoor | 21 | 6 | 27 | 64 BIT 6 MALFUNCTION<br>32    5 MODE ECHO<br>16    4 MODE ECHO<br>4     2 AUX HT<br>2     1 DEFROST<br>1     0 LOCKOUT | | | | | 149 OTDR AMB | | 0 COMP SPD | | 104 OTDR % HUM |

TABLE II-continued

Enhanced Single Speed Message Format For Versions COPE1-27 And Above

| KEY | | | | | | | | | | |
|---|---|---|---|---|---|---|---|---|---|---|
| | ⑨ | | | | | | | | | |
| From Indoor | 80 | 129 | 0 | 0 | 0 EEV POS | 0 BLWR SPD | 0 STRP HT | 53 OUT PID | 15 PWM OFF TIME | 5 PWM ON TIME | 0 | 255 PID DER TERM | 0 FLAG | 25 |

```
18 BIT   3 DIAGNOSTICS
4        2 DEFROST
2        1 RU COMM ERROR
1        0 OD COMM ERROR
```

TABLE III

| | |
|---|---|
| HUM SET PT | Humidity Set Point |
| HUM % | Measured Indoor Relative Humidity (times 2) |
| INV SPD | Inverter Speed (0 = off; 200 = on) |
| OUT FAN | Outdoor Fan Speed (0 = off; 100 = low; 200 = high) |
| STP HT | Number of Levels of Resistance Heat On |
| EEV POS | Electronic Expansion Valve Open Position |
| BLWR SPD | Indoor Blower Speed |
| CHECK SUM | Sum (modulo 256) of Numbers in Message |
| HR | Hour of Day |
| MIN | Minute of Day |
| TEMP WHOLE | Measured Room Temperature Whole Number |
| TEMP FRACT | Measured Room Temperature Fractional Part |
| SET PT | Thermostat Set Point |
| NXT PRG TIME | Next Programmed Set Point Change Time |
| NXT PRG ST PT | Next Programmed Set Point |
| BLWR SPD | Indoor Blower Speed in Fan ON Mode |
| DIAG MODE | Diagnostic Mode Number |
| MNUL MODE | Manual Mode |
| NORM | Normal Running Mode |
| PWR UP | Power Up |
| KEY PRES | Key Pressed |
| CMFT | Comfort Mode |
| ECON | Economy Mode |
| PARAMETER SETUP | Parameter Setup Mode |
| BLOWER ON | Blower in Fan ON Mode |
| LOCKOUT OVRIDE | Compressor Lockout Time Override |
| MODE | Off Cool Heat or Emer Operating Mode |
| CONFIG | Outdoor Configuration |
| MODE | Operating Mode of Outdoor Unit |
| INV FRQ | Inverter Frequency (Compressor ON or OFF) |
| MALF | Outdoor Malfunction Codes |
| SUCT TEMP | Suction Temperature |
| DSCH TEMP | Discharge Temperature |
| OTDR AMB | Outdoor Ambient Temperature |
| OTDR COIL 1 | Outdoor Coil Temperature #1 |
| OTDR COIL 2 | Outdoor Coil Temperature #2 |
| CRNT | Compressor Current |
| OTDR % HUM | Outdoor Percent Relative Humidity |
| ST PT OVRIDE | Set Point Override |
| DIAG | Diagnostic Mode Number |
| COMP SPD | Compressor Speed (ON/OFF) |
| OTDR AMB | Outdoor Ambient Temperature |
| OTDR % HUM | Outdoor Percent Relative Humidity |
| MALFUNCTION | System Operating Under a Malfunction |
| MODE ECHO | System Mode (Heat, etc.) Echoed to Thermostat |
| AUX HT | Resistance Strip Heat ON/OFF |
| DEFROST | Running Defrost Routine |
| LOCKOUT | Compressor in Lockout Time |
| EEV POS | Electronic Expansion Valve Open Position |
| BLWR SPD | Indoor Blower Speed |
| STRP HT | Number of Strip Heat Levels ON |
| OUT PID | PID Control Value |
| PWM OFF TIME | Minutes Strip Heat or Compressor OFF in Cycle |
| PWM ON TIME | Minutes Strip Heat or Compressor ON in Cycle |
| PID DER TERM | Value of Derivative Term of PID Value |
| DIAGNOSTICS | System in Diagnostics Mode |
| DEFROST | System in Defrost Mode |
| RU COMM ERROR | Communication Fault Between Indoor & Thermostat |
| OD COMM ERROR | Communication Fault Between Indoor & Outdoor |

Note:
In message 2 the top set of abbreviations describe the numbers shown when the system is in manual mode. The lower set of abbreviations describe the numbers in normal running mode.

What is claimed is:

1. A method of diagnosing an undesired refrigerant charge condition in a refrigeration system of the type having a variably settable expansion valve for metering refrigerant flow, comprising:
   storing at least one temperature reference value and at least one valve setpoint value;
   measuring a quantity indicative of environment temperature to determine a first measured temperature value;
   causing said expansion valve to attain a predetermined setting based on said valve setpoint value;
   while said valve is at said predetermined setting, measuring a quantity indicative of refrigeration system temperature to determine a second measured temperature value;
   using said first measured temperature value to access said temperature reference value and comparing the accessed temperature reference value with said second measured temperature value; and
   declaring an undesired refrigerant charge condition to exist when said accessed temperature reference value and said second measured temperature value are not within a predefined numerical proximity to one another.

2. The method of claim 1 further comprising storing a plurality of temperature reference values and using said first measured temperature value to access one of said plurality of temperature reference values corresponding to the first measured temperature value.

3. The method of claim I further comprising declaring an overcharge condition when said second measured value is less than said temperature reference value.

4. The method of claim 1 further comprising declaring an undercharge condition when said second measured value is greater than said temperature reference value.

5. The method of claim 1 further comprising declaring an overcharge condition when said second measured value is less than said temperature reference value by a predetermined amount.

6. The method of claim 1 further comprising declaring an undercharge condition when said second measured value is greater than said temperature reference value by a predetermined amount.

7. The method of claim 5 wherein said predetermined amount is about three degrees Fahrenheit.

8. The method of claim 6 wherein said predetermined amount is about three degrees Fahrenheit.

9. The method of claim I wherein said step determining a second measured temperature value is performed by measuring a plurality of temporally spaced quantities indicative of refrigeration system temperature and deriving said second measured temperature as an average of said measured plurality of temporally spaced quantities.

10. The method of claim 1 further comprising storing a plurality of valve setpoint values and causing said expansion valve to attain a predetermined setting using a selected one of said plurality of valve setpoint values corresponding to said first measured temperature.

11. A method of diagnosing a refrigerant overcharge condition in a refrigeration system of the type having a variably settable expansion valve for metering refrigerant flow, comprising:
   storing a temperature setpoint value and a valve setpoint value;

periodically causing said expansion valve to attain a setting determined by said valve setpoint value;

while said expansion valve is at a setting determined by said valve setpoint value measuring a quantity indicative of refrigeration system temperature to determine a measured value;

declaring an overcharge condition to exist when said measured value is outside a predefined proximity to said temperature setpoint value.

* * * * *

UNITED STATES PATENT AND TRADEMARK OFFICE
CERTIFICATE OF CORRECTION

PATENT NO. : 5,381,669
DATED : January 17, 1995
INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

Column 7, line 22, "48" should be -- 46 --.

Column 7, line 39, "48" should be -- 46 --.

Column 7, line 41, "48" should be -- 46 --.

Column 22, line 5, after "value" insert -- [Tref] --.

Column 22, line 6, after "value" (2nd occurrence) insert --[EXVm]--

Column 22, lines 7 & 8, after "temperature" insert -- [Tout] --.

Column 22, line 14, after "temperature" insert -- [Tact] --.

Column 22, line 30, " | " should be -- 1 --.

Column 22, line 51, " | " should be -- 1 --.

Signed and Sealed this

Sixteenth Day of May, 1995

Attest:

BRUCE LEHMAN

Attesting Officer     Commissioner of Patents and Trademarks